(12) United States Patent
Araki

(10) Patent No.: US 9,602,829 B2
(45) Date of Patent: Mar. 21, 2017

(54) DECODING DEVICE, DECODING METHOD, AND PROGRAM

(71) Applicant: SONY CORPORATION, Tokyo (JP)

(72) Inventor: Yuichi Araki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/648,345

(22) PCT Filed: Nov. 25, 2013

(86) PCT No.: PCT/JP2013/081595
§ 371 (c)(1),
(2) Date: May 29, 2015

(87) PCT Pub. No.: WO2014/087860
PCT Pub. Date: Jun. 12, 2014

(65) Prior Publication Data
US 2015/0304673 A1 Oct. 22, 2015

(30) Foreign Application Priority Data
Dec. 6, 2012 (JP) .................................. 2012-267399

(51) Int. Cl.
*G06K 9/00* (2006.01)
*H04N 19/44* (2014.01)
*H04N 19/436* (2014.01)
*H04N 19/70* (2014.01)
*H04N 19/174* (2014.01)

(52) U.S. Cl.
CPC ........... *H04N 19/44* (2014.11); *H04N 19/174* (2014.11); *H04N 19/436* (2014.11); *H04N 19/70* (2014.11)

(58) Field of Classification Search
CPC .... H04N 19/112; H04N 19/119; H04N 19/13; H04N 19/167; H04N 19/174; H04N 19/176; H04N 19/436; H04N 19/44; H04N 19/70; H04N 19/91
See application file for complete search history.

(56) References Cited

U.S. PATENT DOCUMENTS

| | | | |
|---|---|---|---|
| 9,014,494 B2* | 4/2015 | Esenlik | H04N 19/70 382/232 |
| 2012/0230428 A1 | 9/2012 | Segall et al. | |
| 2015/0341642 A1* | 11/2015 | Hendry | H04N 19/119 375/240.02 |

OTHER PUBLICATIONS

Bross, et al., High efficiency video coding (HEVC) text specification draft 8, Joint Collaborative Team on Video Coding (JCT-VC) of ITU-T SG16 WP3 and ISO/IEC JTC1/SC29/WG11, Jul. 11-20, 2012, p. i-250, 10$^{th}$ Meeting, Stockholm, SE.

(Continued)

*Primary Examiner* — Jose Couso
(74) *Attorney, Agent, or Firm* — Paratus Law Group, PLLC

(57) ABSTRACT

The present technique relates to a decoding device, a decoding method, and a program which can decode an image in parallel for each of tiles of the image. A parallel decoding unit decodes the image encoded by for example an encoding method called high efficiency video coding (HEVC) in parallel for each tile used for example the encoding method called HEVC. The present technique can be applied to a decoding device for receiving and decoding an encoded stream encoded by for example the encoding method called HEVC, and generates an image.

11 Claims, 18 Drawing Sheets

(56) References Cited

OTHER PUBLICATIONS

Sasai, et al., Constrained Tile for parallel decoding, Joint Collaborative Team on Video Coding (JCT-VC) of ITU-T SG16 WP3 and ISO/IEC JTC1/SC29/WG11, Feb. 1-10, 2012, p. 1-4, $8^{th}$ Meeting, San Jose, CA, USA.

Sjöberg, et al., AHG4: Enabling decoder parallelism with tiles, Joint Collaborative Team on Video Coding (JCT-VC) of ITU-T SG16 WP3 and ISO/IEC JTC1/SC29/WG11, Apr. 27-May 7, 2012, p. 1-15, $9^{th}$ Meeting, Geneva, CH.

Zhou, AHG4: Enable parallel decoding with tiles, Joint Collaborative Team on Video Coding (JCT-VC) of ITU-T SG16 WP3 and ISO/IEC JTC1/SC29/WG11, Apr. 27-May 7, 2012, p. 1-9, $9^{th}$ Meeting, Geneva, CH.

Misra, et al., Tiles for parallel decoding, Joint Collaborative Team on Video Coding (JCT-VC) of ITU-T SG16 WP3 and ISO/IEC JTC1/SC29/WG11, Mar. 16-23, 2011, p. 1-5, $5^{th}$ Meeting, Geneva, CH.

Fuldseth, Replacing slices with tiles for high level parallelism, Joint Collaborative Team on Video Coding (JCT-VC) of ITU-T SG16 WP3 and ISO/IEC JTC1/SC29/WG11, Jan. 20-28, 2011, p. 1-5, $4^{th}$ Meeting, Daegu, KR.

Nov. 9, 2016, EP communication issued for related EP application No. 13861249.4.

Kiran Misra, et al., Tiles, Joint Collaborative Team on Video Coding (JCT-VC) of ITU-T SG16 WP3 and ISO/IEC JTC1/SC29/WG11, 5th Meeting, Mar. 16-23, 2011, Geneva, CH, JCTVC-E412, pp. 1-4.

Arild Fuldseth, et al., Tiles, Joint Collaborative Team on Video Coding (JCT-VC) of ITU-T SG16 WP3 and ISO/IEC JTC1/SC29/WG11, 5th Meeting, Mar. 16-23, 2011, Geneva, CH, JCTVC-E408, pp. 1-14.

\* cited by examiner

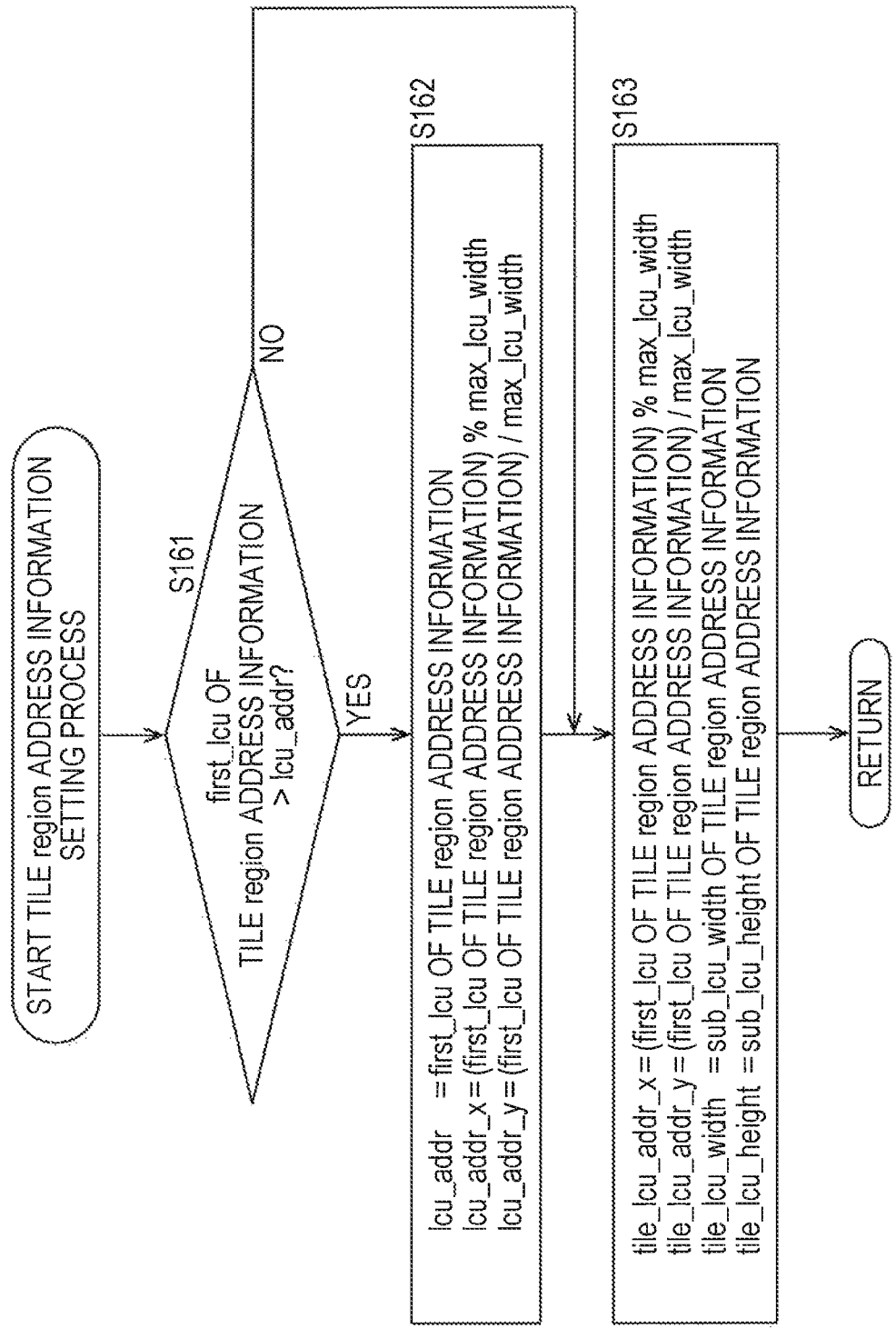

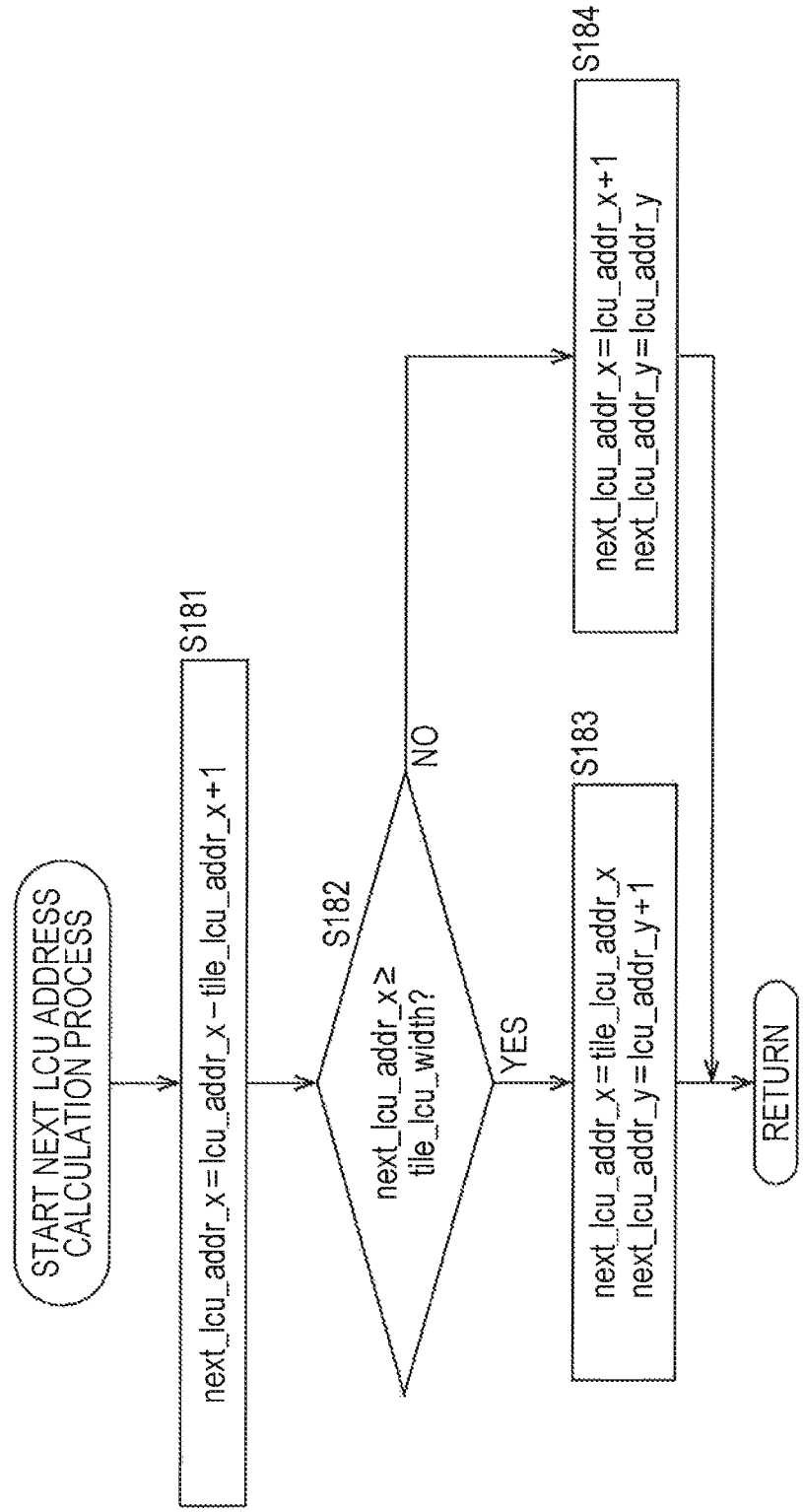

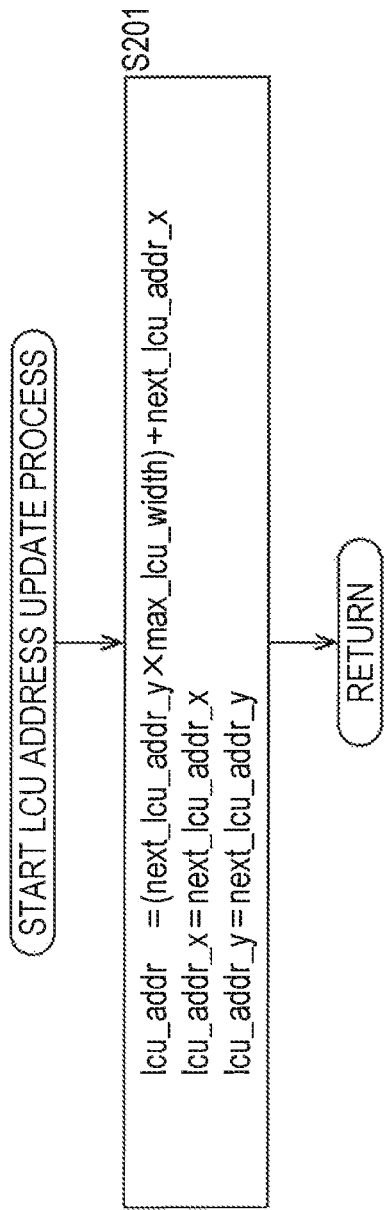

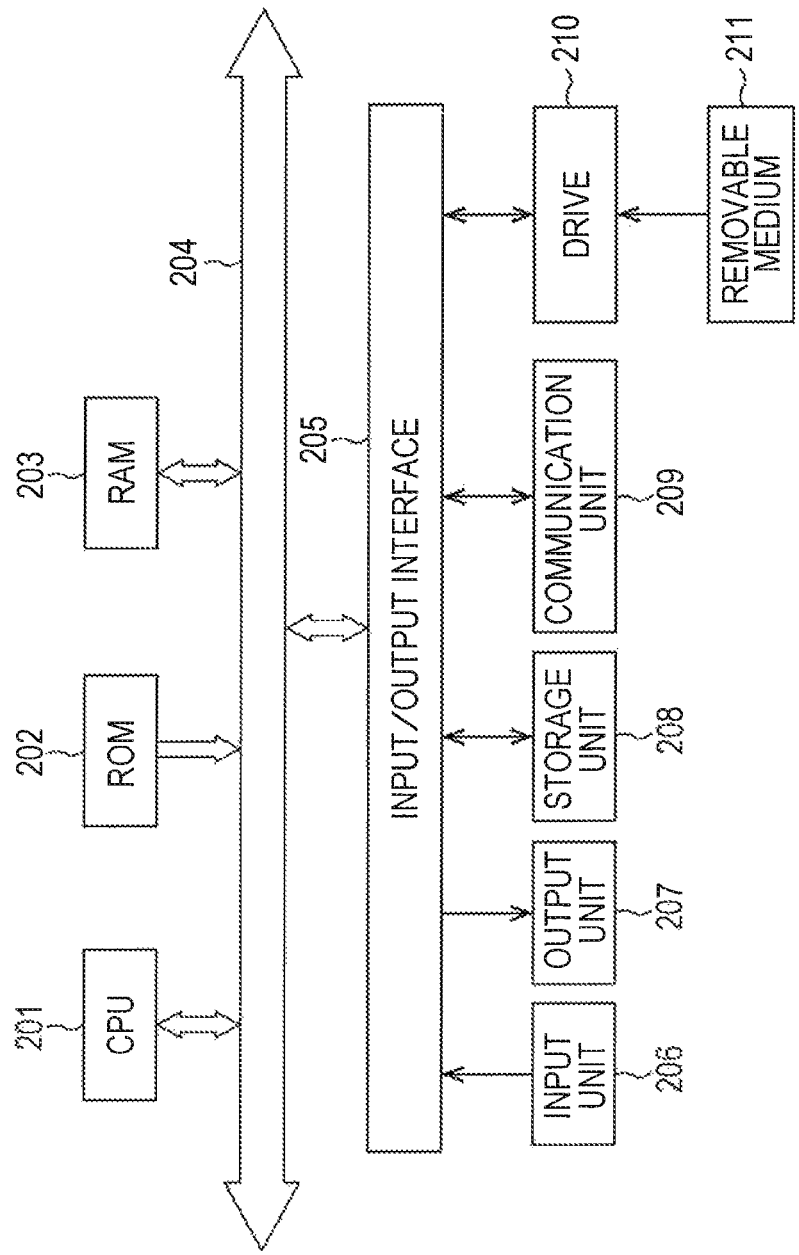

DECODING DEVICE, DECODING METHOD, AND PROGRAM

CROSS REFERENCE TO PRIOR APPLICATION

This application is a National Stage Patent Application of PCT International Patent Application No. PCT/JP2013/081595 (filed on Nov. 25, 2013) under 35 U.S.C. §371, which claims priority to Japanese Patent Application No. 2012-267399 (filed on Dec. 6, 2012), which are all hereby incorporated by reference in their entirety.

TECHNICAL FIELD

The present technique relates to a decoding device, a decoding method, and a program, more particularly, to a decoding device, a decoding method, and a program which can decode an image in parallel for each of tiles of the image.

BACKGROUND ART

In recent years, an encoding method called high efficiency video coding (HEVC) has been standardized in order to improve encoding efficiency of a moving image (e.g., see Non-Patent Document 1). The HEVC can employ a tile in addition to a slice, as a unit of an image which does not have a dependence relationship with another image and can be decoded independently (hereinafter, referred to as independently decodable unit).

The slice and tile are the independently decodable unit, so that the image split into slices or tiles can be decoded in parallel.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 8", JCTVC-J1003_d7, 2012 Jul. 28

SUMMARY OF THE INVENTION

Problems to be Solved by the Invention

However, a decoding device for decoding an image in parallel for each tile has not been provided.

The present technique is made in view of such a circumstance, and is configured to decode an image in parallel for each tile.

Solutions to Problems

According to one aspect of the present technique, a decoding device includes a parallel decoding unit for decoding an image in parallel for each tile.

A decoding method and a program according to one aspect of the present technique correspond to the decoding device according to one aspect of the present technique.

According to one aspect of the present technique, an image is decoded in parallel for each tile.

Effects of the Invention

According to one aspect of the present technique, an image is decoded in parallel for each tile.

BRIEF DESCRIPTION OF DRAWINGS

FIG. 15 is a flowchart illustrating in detail a tile region address information setting process of FIG. 13.

FIG. 16 is a flowchart illustrating in detail a next LCU address calculation process of FIG. 13.

FIG. 17 is a flowchart illustrating in detail an LCU address update process of FIG. 13.

FIG. 18 is a block diagram illustrating an exemplary configuration of hardware of a computer.

MODE FOR CARRYING OUT THE INVENTION

First Embodiment

Exemplary Configuration of Decoding Device According to First Embodiment

Figure 1:
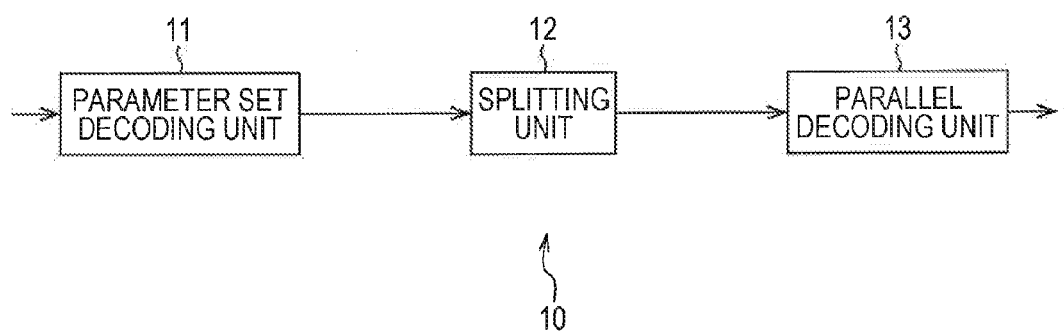
FIG. 1 is a block diagram illustrating an exemplary configuration of a decoding device according to a first embodiment of the present technique.

FIG. 1 is a block diagram illustrating an exemplary configuration of a decoding device according to a first embodiment of the present technique.

The decoding device 10 of FIG. 1 includes a parameter set decoding unit 11, a splitting unit 12, and a parallel decoding unit 13. The decoding device 10 decodes an encoded stream encoded with HEVC in parallel for each slice or tile.

Specifically, the parameter set decoding unit 11 of the decoding device 10 separates a sequence parameter set (SPS), a picture parameter set (PPS), a slice header, and encoded data for each slice (hereinafter, referred to as slice data) from the encoded stream input from outside. The parameter set decoding unit 11 extracts, from the SPS, picture size information representing the number of largest coding units (LCU) as a largest coding unit of a picture. The picture size information includes the number of LCUs pic_lcu_width representing the number of LCUs in a horizontal direction, and the number of LCUs pic_lcu_height representing the number of LCUs in a vertical direction.

Further, the parameter set decoding unit 11 determines, based on the PPS, picture tile information representing tile information of a corresponding picture. It is noted that the picture tile information includes a flag tile_flag representing the presence of a tile in a picture, the number of tiles tile_columns_num representing the number of tiles in a horizontal direction (row direction) and the number of tiles tile_rows_num representing the number of tiles in a vertical direction (column direction) of the picture, and the number of LCUs tile_column_width[i] representing the number of LCUs in a horizontal direction and the number of LCUs tile_row_height[i] representing the number of LCUs in a vertical direction in the i-th tile of the picture, or a flag tile_flag representing the absence of the tile in the picture.

Further, the parameter set decoding unit 11 extracts, from the slice header, slice address information slice_lcu_addr representing an address of the LCU at the head of a corresponding slice. The parameter set decoding unit 11 determines, based on the slice header, slice tile information representing tile information of the corresponding slice. It is noted that the slice tile information includes a number offset_num obtained by subtracting 1 from the number of tiles in the slice, and a byte amount offset_bytes[i] of the encoded data of the i-th tile in the slice.

The parameter set decoding unit 11 supplies the picture size information, the slice address information, the picture tile information, the slice tile information, and the slice data, to the splitting unit 12.

The splitting unit 12 generates tile region address information for specifying a tile as a unit region for parallel decoding in the parallel decoding unit 13, based on the picture size information, the slice address information, and the picture tile information from the parameter set decoding unit 11.

It is noted that region address information includes the number of LCUs lcu_width representing the number of LCUs in a horizontal direction and the number of LCUs lcu_height representing the number of LCUs in a vertical direction of the picture including the unit region for parallel decoding, an address first_lcu representing the address of an LCU at the head of the unit region for parallel decoding, and the number of LCUs sub_lcu_width representing the number of LCUs in a horizontal direction and the number of LCUs sub_lcu_height representing the number of LCUs in a vertical direction of the unit region for parallel decoding.

Further, the splitting unit 12 generates, based on the picture size information and the slice address information, slice region address information for specifying a slice as the unit region for parallel decoding in the parallel decoding unit 13.

Further, the splitting unit 12 generates, based on the flag tile_flag, a flag region_tile_flag representing whether the tile region address information is present. Further, the splitting unit 12 cuts out the encoded data for each slice or tile from the slice data supplied from the parameter set decoding unit 11, based on the picture size information, the slice address information, the picture tile information, and the slice tile information.

The splitting unit 12 supplies to the parallel decoding unit 13 the picture size information, the slice address information, the slice region address information, the tile region address information, the encoded data for each slice or tile, and the flag region_tile_flag, as region information.

The parallel decoding unit 13 uses the region information supplied from the splitting unit 12 to decode, in parallel, the encoded data for each slice or tile in the unit region for parallel decoding.

<First Example of Encoded Stream>

Figure 2:
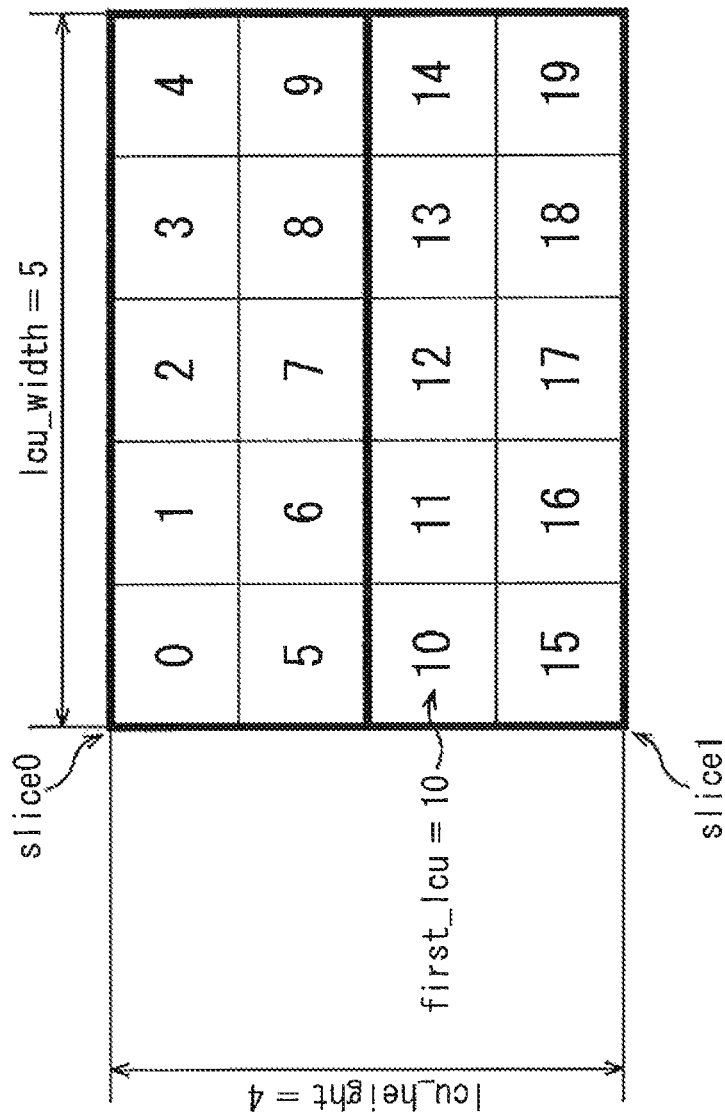
FIG. 2 is a diagram illustrating an independently decodable unit according to a first example of an encoded stream.

FIG. 2 is a diagram illustrating an independently decodable unit according to a first example of the encoded stream input to the decoding device 10 of FIG. 1.

It is noted that, according to an example of FIG. 2, the picture includes 20 LCUs of a 5×4 matrix, for ease of description. Further, in FIG. 2, squares having numbers represent LCUs, and each of the LCUs has an address of the same number. The independently decodable units of FIGS. 4 and 6 have the similar configurations.

According to the example of FIG. 2, the picture is split into two upper and lower slices (slice0, slice1). That is, a slice (slice0) at the head includes upper half 10 LCUs of a 5×2 matrix, and the next slice (slice1) includes lower half 10 LCUs of a 5×2 matrix.

According to this configuration, as illustrated in FIG. 2, the address first_lcu of the slice (slice0) at the head is 0 in the slice region address information, and the address first_lcu of the next slice (slice1) is 10 in the slice region address information. Further, in the slice region address information of the slice (slice0) at the head and the next slice (slice1), the number of LCUs lcu_width is 5, and the number of LCUs lcu_height is 4.

Further, in the slice (slice0) at the head, the LCUs having the addresses of 0 to 9 are sequentially decoded, and in the next slice (slice1), the LCUs having the addresses of 10 to 19 are sequentially decoded.

Figure 3:
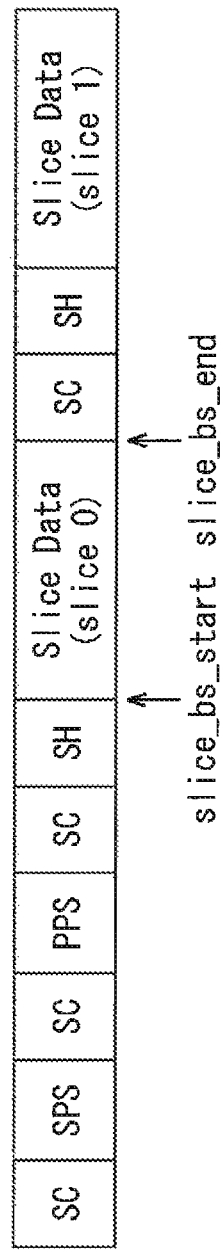
FIG. 3 is a diagram illustrating an exemplary configuration of the encoded stream of FIG. 2.

FIG. 3 is a diagram illustrating an exemplary configuration of the encoded stream of FIG. 2.

In the encoded stream of FIG. 2, the picture is split into the two slices, and the encoded stream includes the SPS, the PPS, and two pieces of slice data each added with the slice header (SH), as illustrated in FIG. 3. It is noted that the head of each data is added with a start code (SC) indicating the head of the data.

The SPS of FIG. 3 includes information about a corresponding sequence. Specifically, the SPS includes, as the picture size information, the number of LCUs in a horizontal direction pic_lcu_width (pic_width_in_luma_samples) and the number of LCUs in a vertical direction pic_lcu_height (pic_height_in_luma_samples) of the corresponding picture. The PPS includes corresponding picture information, such as the flag tile_flag (tile_enabled_flag). The flag tile_flag is defined as the picture tile information.

The slice header includes information about the slice data added with the slice header, such as the slice address information slice_lcu_addr (slice address).

The slice data are disposed adjacent a terminal end of a corresponding slice header. In an example of FIG. 2, the picture includes two slices, and two pieces of slice data are disposed. It is noted that hereinafter a position on the encoded stream at the head of each slice data is referred to as slice_bs_start, and a position on the encoded stream at the terminal end of each slice data is referred to as slice_bs_end.

<Second Example of Encoded Stream>

Figure 4:
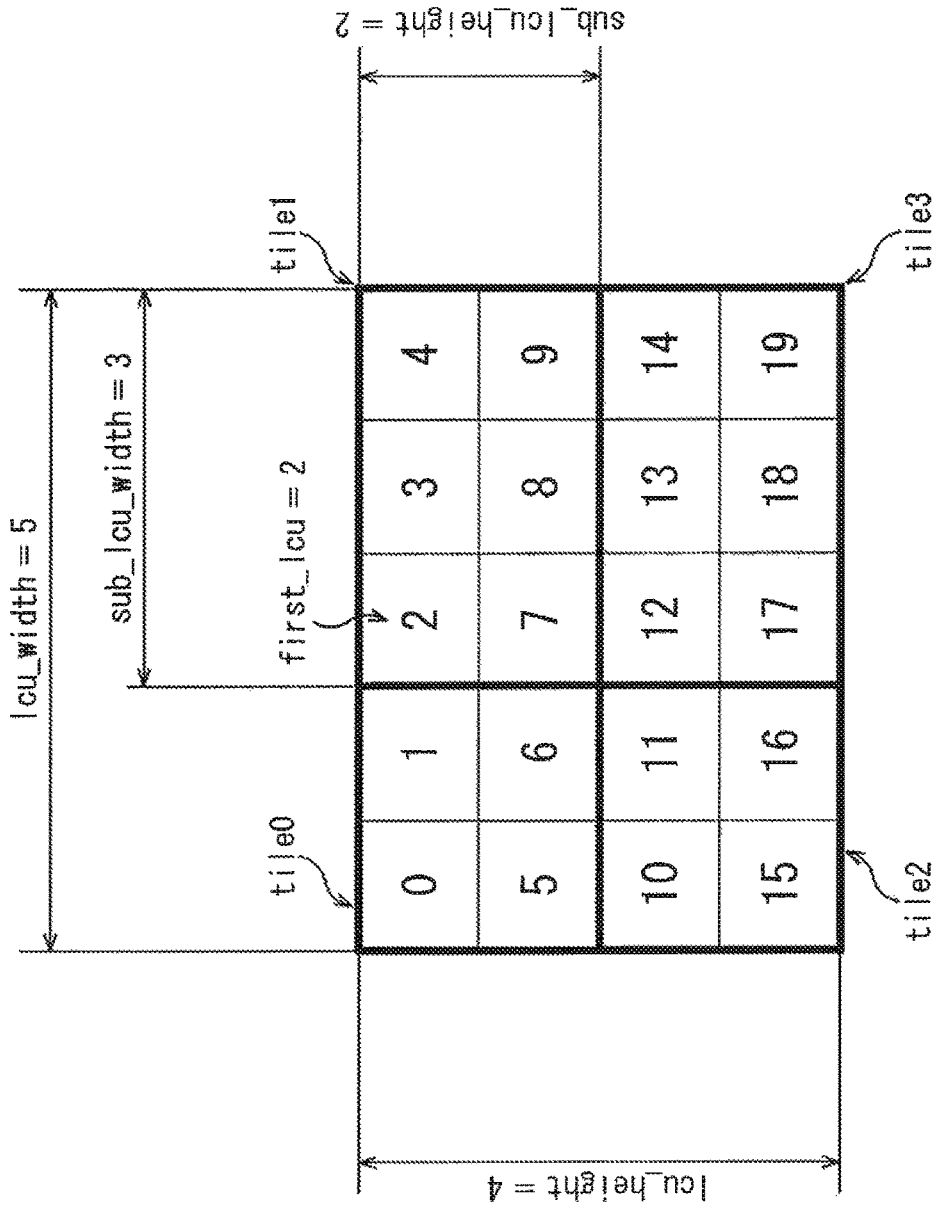
FIG. 4 is a diagram illustrating an independently decodable unit according to a second example of the encoded stream.

FIG. 4 is a diagram illustrating an independently decodable unit according to a second example of the encoded stream input to the decoding device 10 of FIG. 1.

In an example of FIG. 4, the picture is split into four tiles (tile0 to tile3). Specifically, the picture is split into an upper left tile (tile0) including four LCUs of a 2×2 matrix, an upper right tile (tile1) including six LCUs of a 3×2 matrix, a lower left tile (tile2) including four LCUs of a 2×2 matrix, and a lower right tile (tile3) including six LCUs of a 3×2 matrix.

According to this configuration, as illustrated in FIG. 4, in the tile region address information, the address first_lcu of the tile (tile0) at the head is 0, and the address first_lcu of the next tile (tile1) is 2. Further, in the tile region address information, the address first_lcu of the further next tile (tile3) is 10, and the address first_lcu of the next tile (tile1) is 12.

In the tile region address information of the four tiles (tile0 to tile3), the number of LCUs lcu_width is 5, and the number of LCUs lcu_height is 4. Further, in the tile region address information of the tile (tile0) at the head, the number of LCUs sub_lcu_width is 2, and the number of LCUs sub_lcu_height in a vertical direction is 2. In the tile region address information of the next tile (tile1), the number of LCUs sub_lcu_width is 3, and the number of LCUs sub_lcu_height in a vertical direction is 2. In the tile region address information of the further next tile (tile3), the number of LCUs sub_lcu_width is 2, and the number of LCUs sub_lcu_height in a vertical direction is 2. In the tile region address information of the next tile (tile1), the number of LCUs sub_lcu_width is 3, and the number of LCUs sub_lcu_height in a vertical direction is 2.

Further, in the tile (tile0) at the head, the LCUs having the addresses of 0, 1, 5, and 6 are sequentially decoded, and in the next tile (tile1), the LCUs having the addresses of 2 to 4 and 7 to 9 are sequentially decoded. In the further next tile (tile2), the LCUs having the addresses of 10, 11, 15, and 16 are sequentially decoded, and in the next tile (tile3), the LCUs having the addresses of 12 to 14 and 17 to 19 are sequentially decoded.

Figure 5:
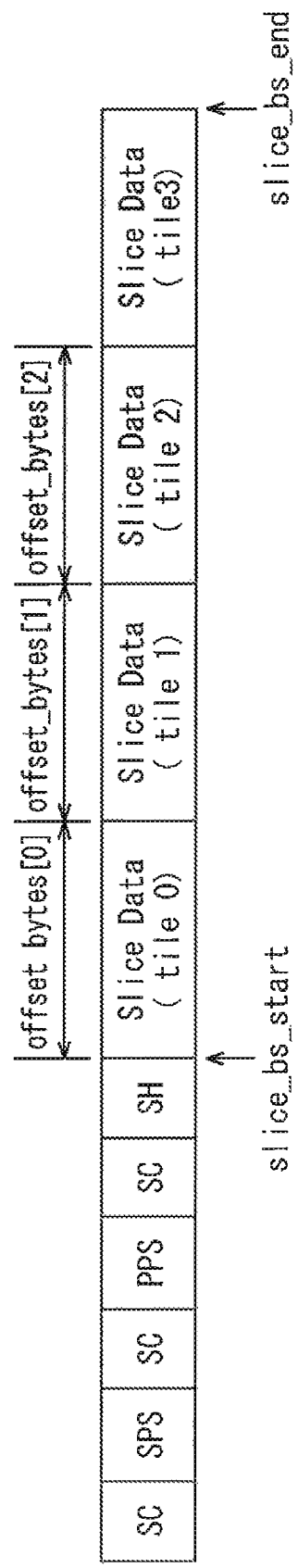
FIG. 5 is a diagram illustrating an exemplary configuration of the encoded stream of FIG. 4.

FIG. 5 is a diagram illustrating an exemplary configuration of the encoded stream of FIG. 4.

In the encoded stream of FIG. 4, the picture is not split into slices, and the encoded stream includes the SPS, the PPS, and one slice data added with the slice header, as illustrated in FIG. 5. It is noted that the head of each data is added with the start code (SC).

The SPS of FIG. 5 is configured similar to the SPS of FIG. 3, and includes the picture size information. The PPS of FIG. 5 includes the flag tile_flag as the corresponding picture information.

Further, the PPS includes, as the corresponding picture information, a number num_tile_columns_minus1 obtained by subtracting 1 from the number of tiles in a horizontal direction and a number num_tile_rows_minus1 obtained by subtracting 1 from the number of tiles in a vertical direction of the picture. The PPS further includes, as the corresponding picture information, a number column_width_minus1[i] obtained by subtracting 1 from the number of LCUs in a horizontal direction of the i-th tile of the picture, and a number row_height_minus1 [i] obtained by subtracting 1 from the number of LCUs in a vertical direction.

Only 1 is added to the number num_tile_columns_minus1 included in the PPS to be defined as the number of tiles tile_columns_num, and only 1 is added to the number num_tile_rows_minus1 to be defined as the number of tiles tile_rows_num. Further only 1 is added to the number column_width_minus1 [i] to be defined as the number of LCUs tile_column_width[i], and only 1 is added to the number row_height_minus1[i] to be defined as the number of LCUs tile_row_height[i]. The flag tile_flag, the number of tiles tile_columns_num, the number of tiles tile_rows_num, the number of LCUs tile_column_width[i], the number of LCUs tile_row_height[i] are defined as the picture tile information.

The slice header includes, as the information about the slice data added with the slice header, a size entry_point_offset representing the size of the encoded data of each tile, and a number num_entry_point_offsets representing the number of the sizes entry_point_offset, in addition to the slice address information slice_lcu_addr.

The size entry_point_offset included in the slice header is defined as the byte amount offset_bytes [i] of the i-th tile. Only 1 is subtracted from the number num_entry_point_offsets to be defined as the number offset_num. The byte amount offset_bytes[i] and the number offset_num are defined as the slice tile information.

The slice data is disposed adjacent the terminal end of the corresponding slice header, as in the case of FIG. 3. In an example of FIG. 4, the picture is not split into slices, but encoded data of four tiles (tile0 to tile3) are disposed as one piece of slice data. A position slice_bs_start is located at a head position of the tile at the head, and a position slice_bs_end is located at a terminal end position of the last tile (tile3).

<Third Example of Encoded Stream>

Figure 6:
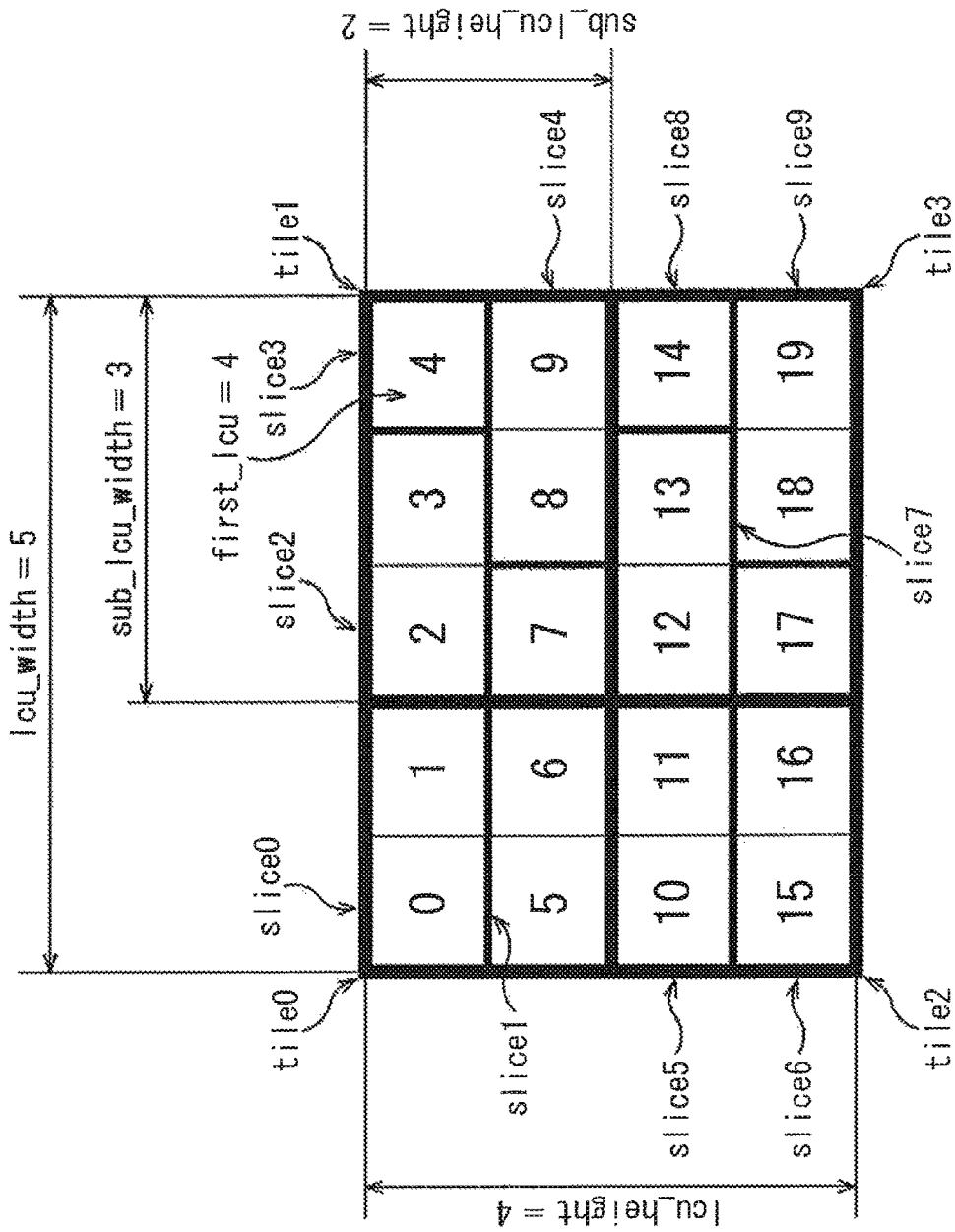
FIG. 6 is a diagram illustrating an independently decodable unit according to a third example of the encoded stream.

FIG. 6 is a diagram illustrating an independently decodable unit according to a third example of the encoded stream input to the decoding device 10 of FIG. 1

In an example of FIG. 6, one picture is split into 10 slices (slice0 to slice9) and four tiles (tile0 to tile3). Specifically, the picture is split into an upper left tile (tile0) including four LCUs of a 2×2 matrix, an upper right tile (tile1) including six LCUs of a 3×2 matrix, a lower left tile (tile2) including four LCUs of a 2×2 matrix, and a lower right tile (tile3) including six LCUs of a 3×2 matrix, as in the case of FIG. 4.

Further, the upper left tile (tile0) is split into two upper and lower slices (slice0, slice1), and the upper right tile (tile1) is split into three slices (slice2 to slice4) each having two LCUs in a raster scan order (decoding order). Further, the lower left tile (tile2) is split into two upper and lower slices (slice5, slice6), and the lower right tile (tile3) is split into three slices (slice7 to slice9) each having two LCUs in the raster scan order.

In this configuration, as illustrated in FIG. 6, the addresses first_lcu of 10 slices (slice0 to slice9) are 0, 5, 2, 4, 8, 10, 15, 12, 14, and 18, respectively, in the slice region address information. Further, the 10 slices (slice0 to slice9) have the number of LCUs lcu_width of 5, and the number of LCUs lcu_height of 4, in the slice region address information. The tile region address information of the four tiles (tile0 to tile3) is configured as in the case of FIG. 4.

Figure 7:
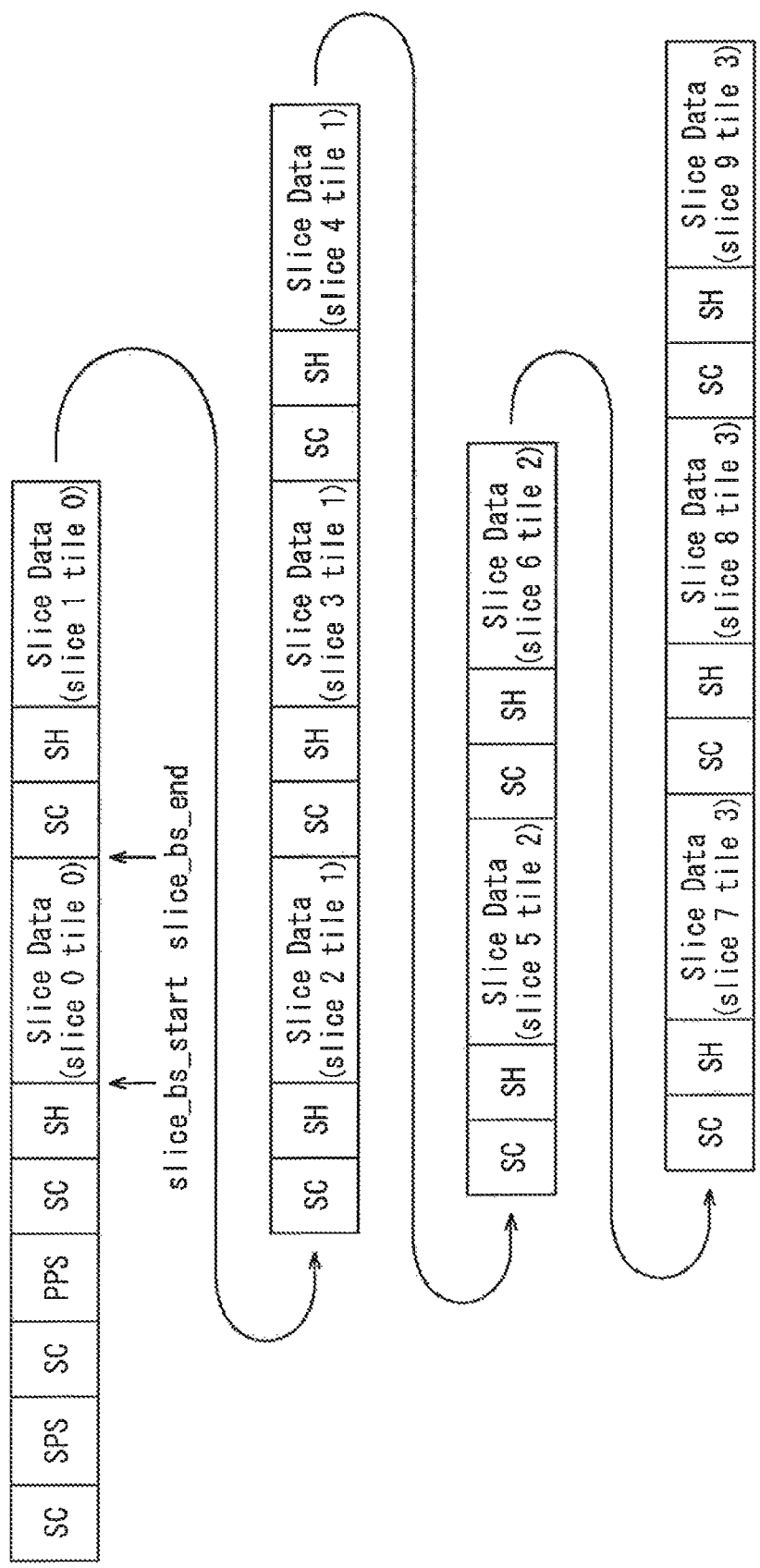
FIG. 7 is a diagram illustrating an exemplary configuration of the encoded stream of FIG. 6.

FIG. 7 is a diagram illustrating an exemplary configuration of the encoded stream of FIG. 6.

In the encoded stream of FIG. 6, the picture is split into 10 slices, and the encoded stream includes the SPS, the PPS, and 10 pieces of slice data each added with the slice header, as illustrated in FIG. 7. It is noted that the head of each data is added with the start code (SC).

The SPS of FIG. 7 is configured similar to the SPS of FIG. 3, and includes the picture size information. The PPS of FIG. 7 is configured similar to the PPS of FIG. 5, and includes the flag tile_flag, the number num_tile_columns_minus1, the number num_tile_rows_minus1, the number column_width_minus1[i], and the number row_height_minus1[i].

The slice header is configured similar to the slice header of FIG. 5, and includes the slice address information slice_l- cu_addr (slice address), the size entry_point_offset, and the number num_entry_point_offsets.

The slice data is disposed adjacent the terminal end of the corresponding slice header, as in the case of FIG. 3. In an example of FIG. 6, the picture is split into 10 slices, and 10 pieces of slice data are disposed.

It is noted that the encoded data of the upper left tile (tile0) includes two pieces of slice data, the encoded data of the upper right tile (tile1) includes three pieces of slice data. The encoded data of the lower left tile (tile2) includes two pieces of slice data, the encoded data of the lower right tile (tile3) includes three pieces of slice data.

<Description of Process of Decoding Device>

Figure 8:
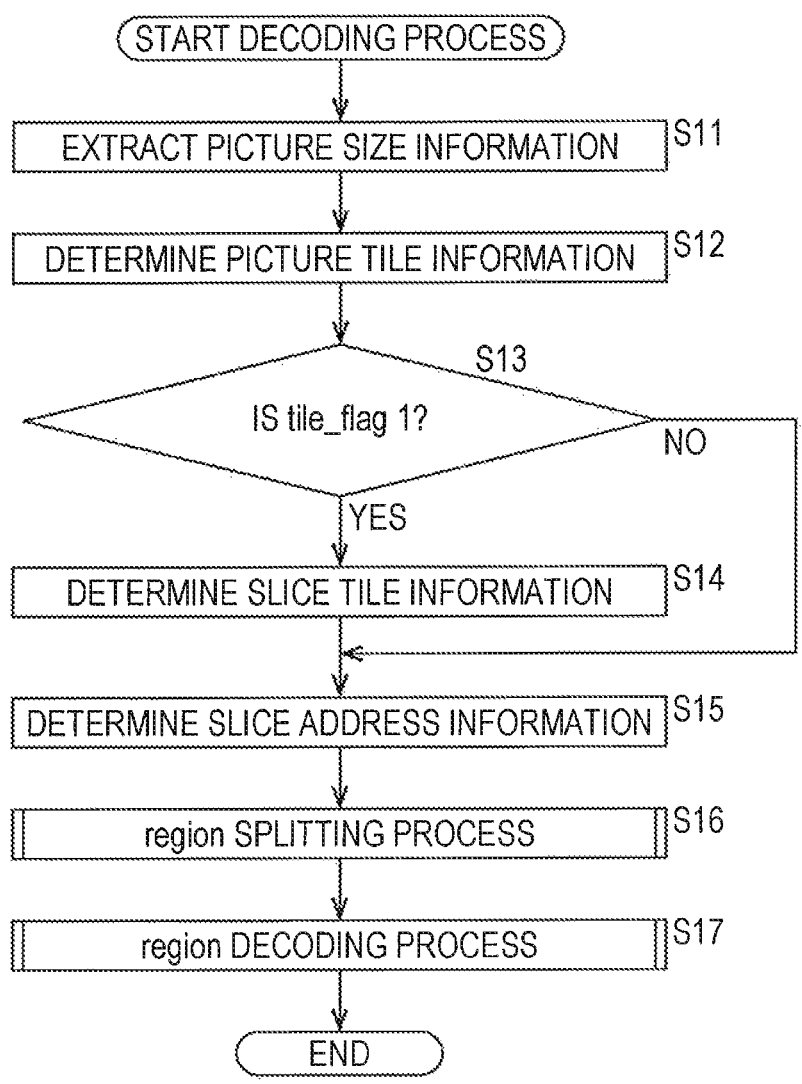
FIG. 8 is a flowchart illustrating a decoding process of the decoding device 10 of FIG. 1.

FIG. 8 is a flowchart illustrating a decoding process of the decoding device 10 of FIG. 1. The decoding process is started, for example, when the encoded stream for each sequence is input to the decoding device 10.

In step S11 of FIG. 8, the parameter set decoding unit 11 of the decoding device 10 separates the SPS from the encoded stream input from the outside, extracts the picture size information from the SPS, and supplies the picture size information to the splitting unit 12. It is noted that subsequent steps S12 to S17 are performed for each picture.

In step S12, the parameter set decoding unit 11 separates the PPS from the encoded stream, determines the picture tile information from the PPS, and supplies the picture tile information to the splitting unit 12.

In step S13, the parameter set decoding unit 11 determines whether the PPS includes the flag tile_flag representing the presence of the tile in the picture is 1. When it is determined that the flag tile_flag is 1 in step S13, the parameter set decoding unit 11 extracts the slice header from the encoded stream, determines the slice tile information from the slice header, and supplies the slice tile information to the splitting unit 12, in step S14. Then, the process proceeds to step S15.

On the other hand, it is determined that the flag tile_flag is not 1 in step S13, the parameter set decoding unit 11 extracts the slice header from the encoded stream, and the process proceeds to step S15.

In step S15, the parameter set decoding unit 11 extracts the slice address information slice_lcu_addr from the slice header, and supplies the slice address information to the splitting unit 12. The parameter set decoding unit 11 extracts the slice data from the encoded stream, and supplies the slice data to the splitting unit 12.

Figure 9:
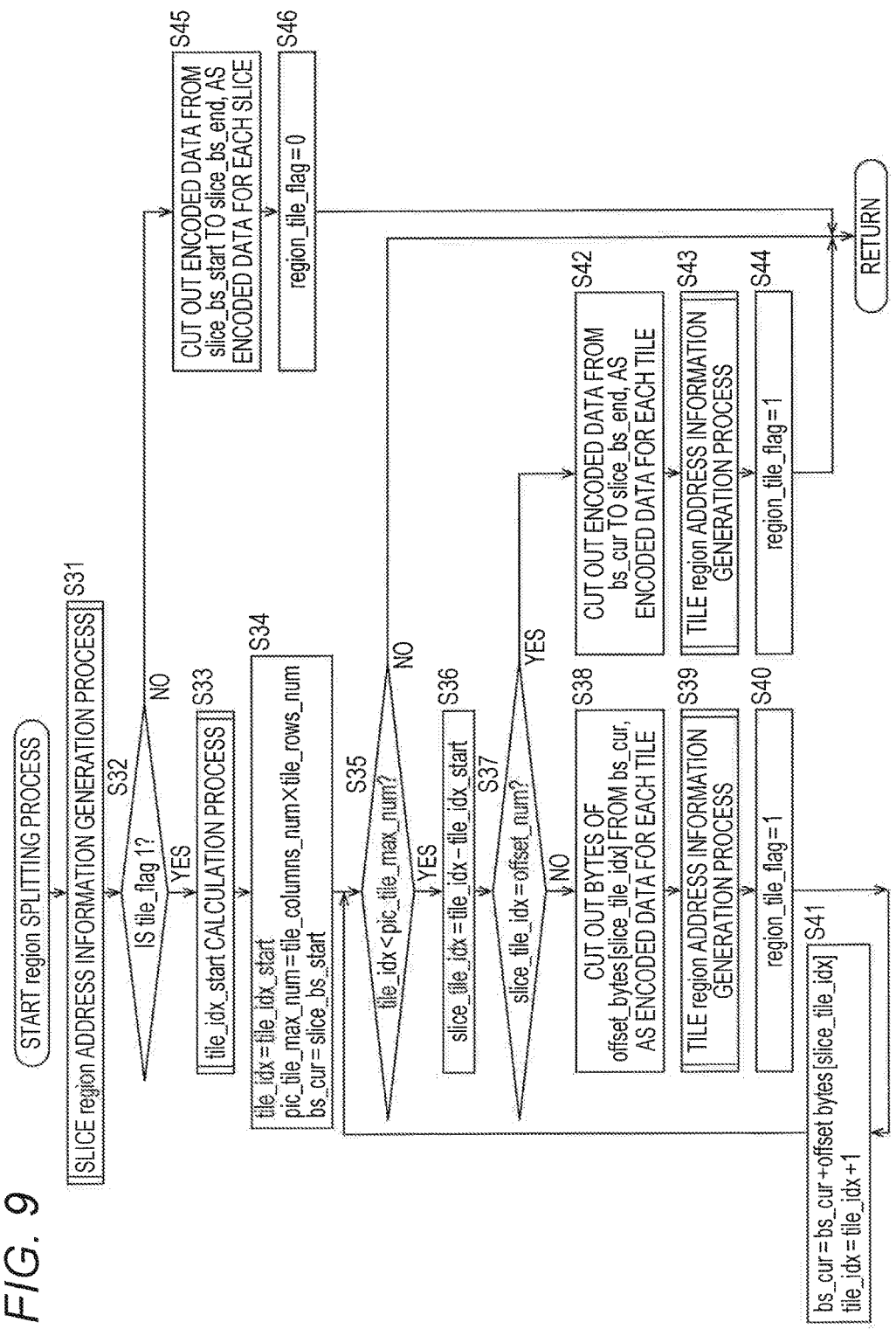
FIG. 9 is a flowchart illustrating in detail a region splitting process of FIG. 8.
Figure 13:
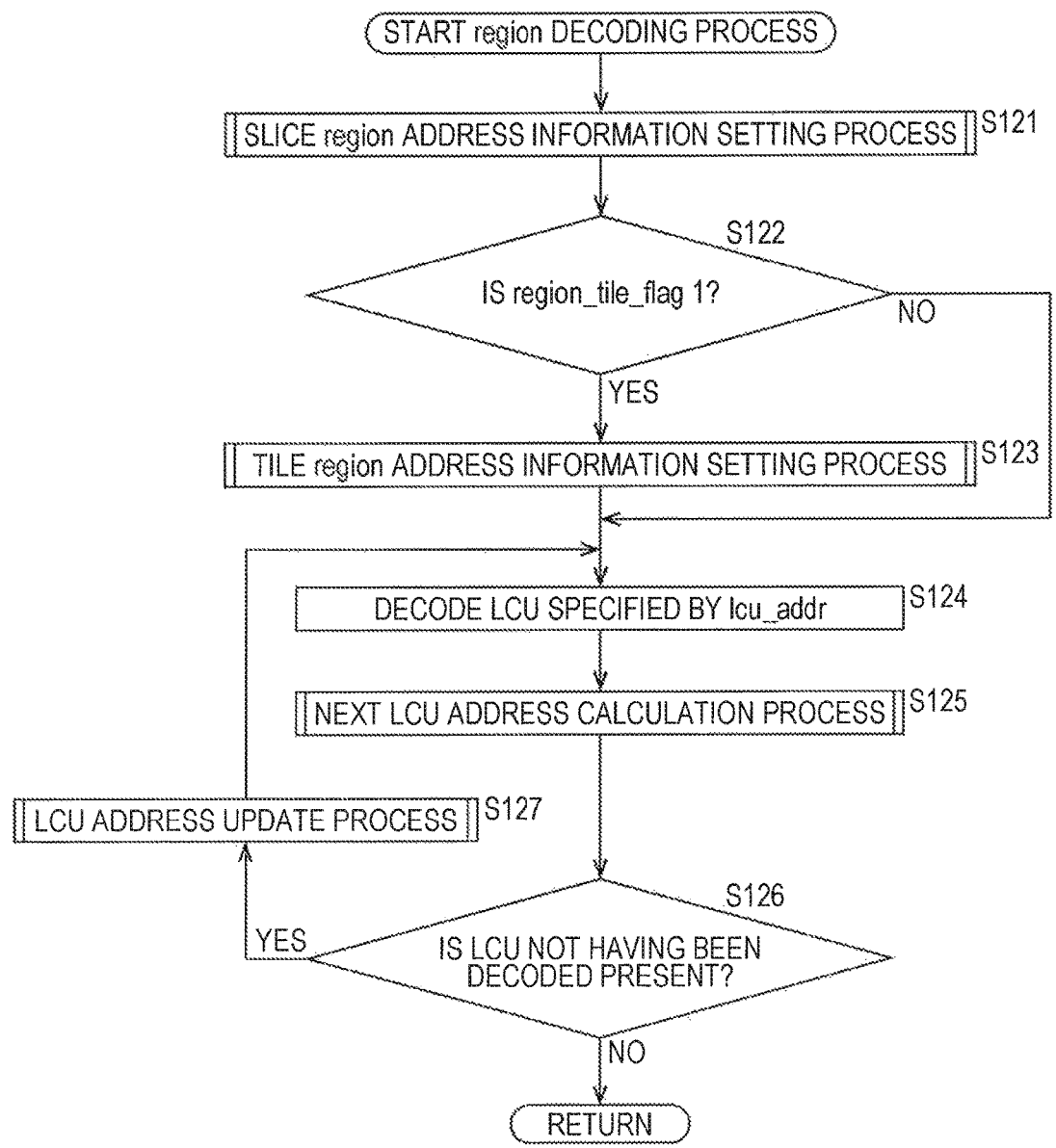
FIG. 13 is a flowchart illustrating in detail a region decoding process of FIG. 8.

In step S16, the splitting unit 12 performs a region splitting process for generating region information. The region splitting process will be described in detail with reference to FIG. 9 illustrated below. In step S17, the parallel decoding unit 13 performs a region decoding process for decoding for unit region for parallel decoding, using region information. The region decoding process will be described in detail with reference to FIG. 13 illustrated below. After the region decoding process, the process ends.

FIG. 9 is a flowchart illustrating in detail the region splitting process of step S16 of FIG. 8. The region splitting process is performed for each slice in the picture to be processed.

Figure 10:
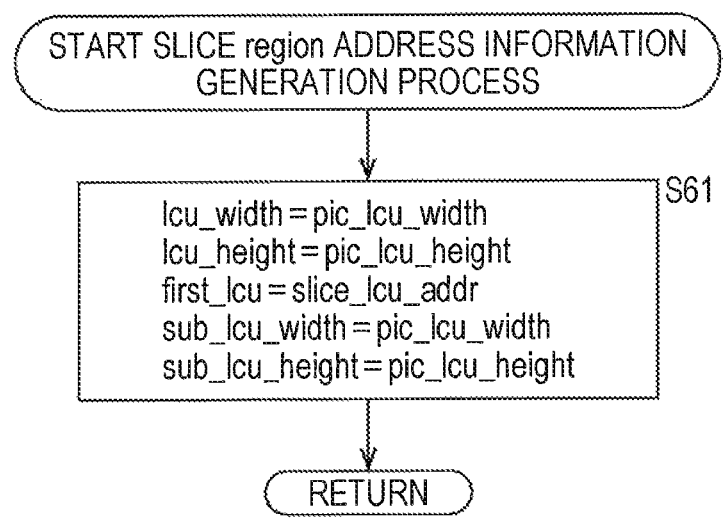
FIG. 10 is a flowchart illustrating in detail a slice region address information generation process of FIG. 9.

In step S31 of FIG. 9, the splitting unit 12 performs the slice region address information generation process for generating the region address information of the slice to be processed. The region address information generation process will be described in detail with reference to FIG. 10 illustrated below.

Figure 11:
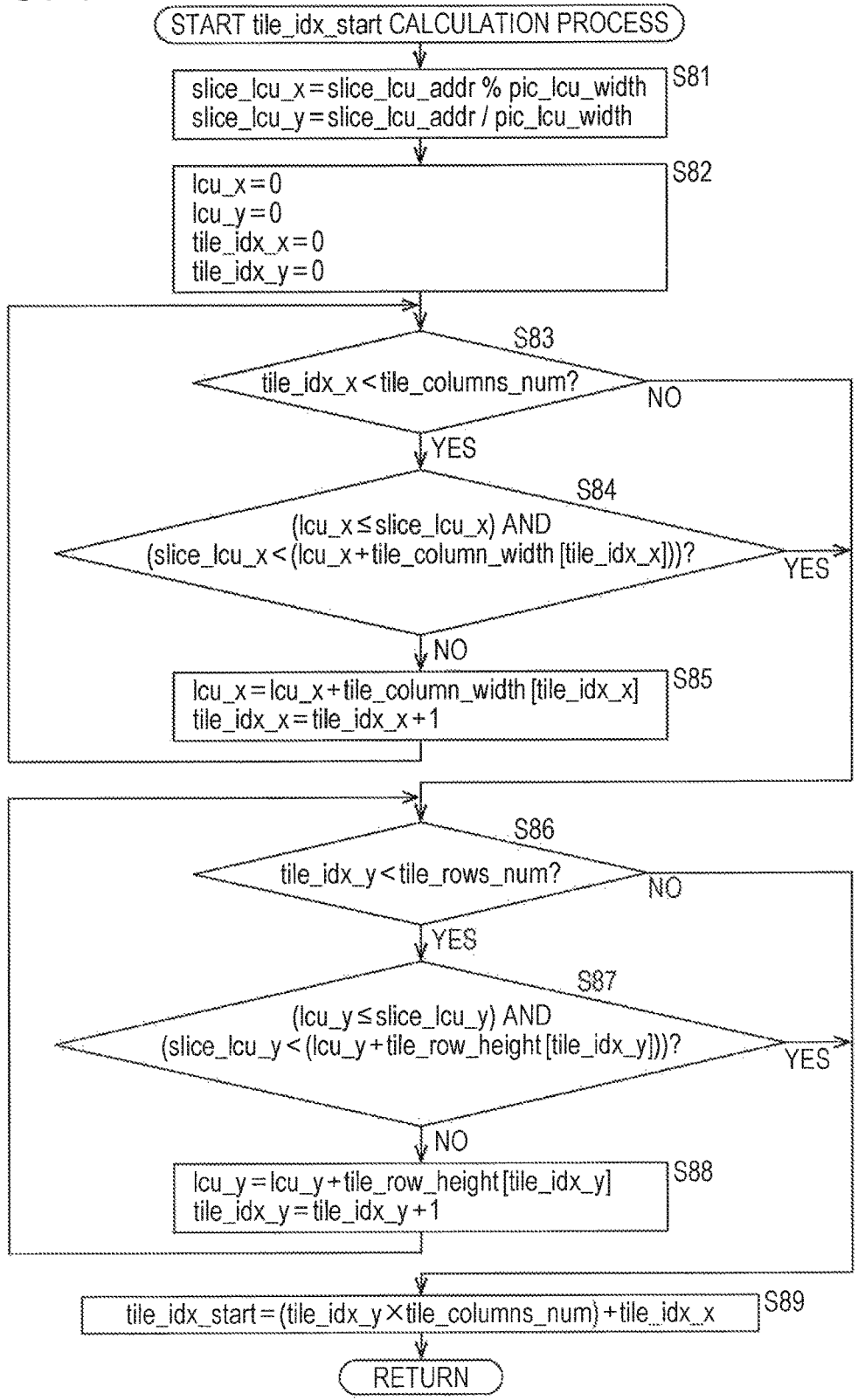
FIG. 11 is a flowchart illustrating in detail a tile_idx_start calculation process of FIG. 9.

In step S32, the splitting unit 12 determines whether the flag tile_flag included in the picture tile information supplied from the parameter set decoding unit 11 is 1. When it is determined that the flag tile_flag is 1 in step S32, the splitting unit 12 performs tile_idx_start calculation process for calculating addresses tile_idx_start added to the tile including the LCU at the head of the slice to be processed in the raster scan order, in step S33. The tile_idx_start calculation process will be described in detail with reference to FIG. 11 illustrated below.

In step S34, the splitting unit 12 sets an address tile_idx to the address tile_idx_start. The splitting unit 12 further multiplies the number of tiles tile_columns_num by the number of tiles tile_rows_num to obtain the total number of tiles pic_tile_max_num of the picture. Further, the splitting unit 12 sets a position bs_cur to the position slice_bs_start of the slice to be processed.

In step S35, the splitting unit 12 determines whether the address tile_idx is smaller than the total number of tiles pic_tile_max_num. When it is determined that the address tile_idx is smaller than the total number of tiles pic_tile_max_num in step S35, the process proceeds to step S36.

In step S36, the splitting unit 12 subtracts the address tile_idx_start from the address tile_idx to obtain an address slice_tile_idx of the tile to be processed. The addresses slice_tile_idx are applied to the tiles in the slice to be processed, and are numbered from 0 in the raster scan order.

In step S37, the splitting unit 12 determines whether the address slice_tile_idx is the same as the number offset_num, or, whether tile having the address slice_tile_idx is the last tile in the slice to be processed.

When it is determined that the address slice_tile_idx is not the same as the number offset_num in step S37, the process proceeds to step S38. In step S38, the splitting unit 12 cuts out, as the encoded data for each tile, the bytes of a byte amount offset_bytes[slice_tile_idx] of the tile at the address slice_tile_idx offset from the position bs_cur, from the slice data of the slice to be processed.

Figure 12:
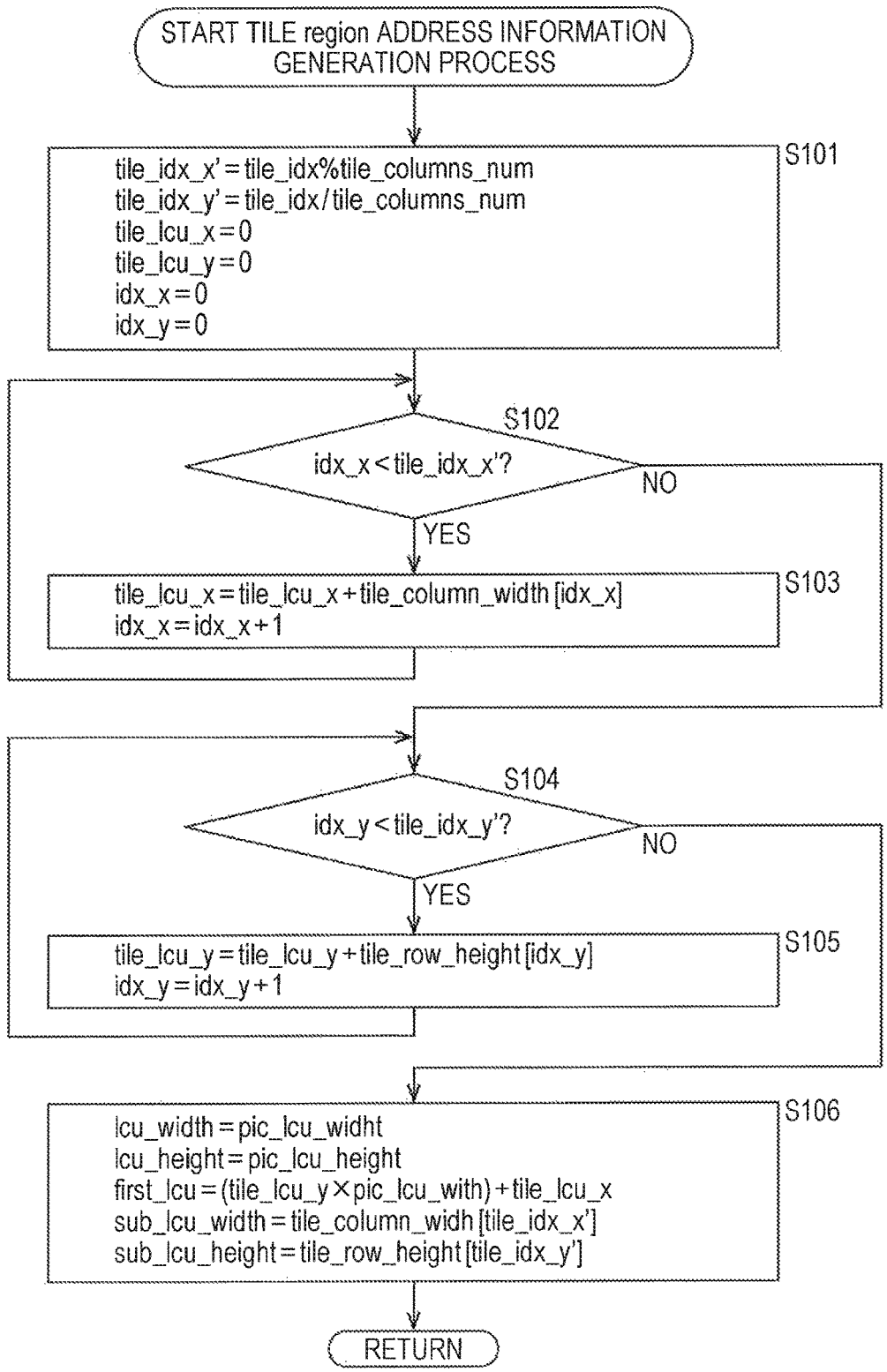
FIG. 12 is a flowchart illustrating in detail a tile region address information generation process of FIG. 9.

In step S39, the splitting unit 12 performs the tile region address information generation process for generating the tile region address information. The tile region address information generation process will be described in detail with reference to FIG. 12 illustrated below.

In step S40, the splitting unit 12 sets the flag region_tile_flag to 1 representing the presence of the tile region address information. The splitting unit 12 supplies to the parallel decoding unit 13 the picture size information, the slice address information, the slice region address information, the tile region address information, the encoded data for each tile, and the flag region_tile_flag, as the region information.

In step S41, the splitting unit 12 increments the position bs_cur by the bytes of the byte amount offset_bytes[slice_tile_idx]. That is, the splitting unit 12 sets the position bs_cur to the position of the terminal end of the encoded data cut out in step S38. The splitting unit 12 further increments the address tile_idx by only 1. Then, the process returns to step S35, and the following steps are repeated.

On the other hand, when it is determined that the address slice_tile_idx is the same as the number offset_num in step S37, or when the tile having the address slice_tile_idx is the last tile in the slice to be processed, the process proceeds to step S42.

In step S42, the splitting unit 12 cuts out, as the encoded data for each tile, the encoded data from the position bs_cur to the position slice_bs_end, from the slice data of the slice to be processed.

In step S43, the splitting unit 12 performs the tile region address information generation process, similar to step S39. In step S44, the splitting unit 12 sets the flag region_tile_flag to 1.

The splitting unit 12 supplies to the parallel decoding unit 13 the picture size information, the slice address information, the slice region address information, the tile region address information, the encoded data for each tile, and the flag region_tile_flag, as the region information. The process returns to step S16 of FIG. 8, and proceeds to step S17.

On the other hand, when it is determined that the address tile_idx is not smaller than the total number of tiles pic_tile_max_num in step S35, the process returns to step S16 of FIG. 8, and proceeds to step S17.

Further, when it is determined that the flag tile_flag is not 1 in step S32, or when the tile is not present in the picture to be processed, the process proceeds to step S45. In step S45, the splitting unit 12 cuts out, as the encoded data for each slice, the encoded data from the position slice_bs_start to the position slice_bs_end, being the slice data of the slice to be processed.

In step S46, the splitting unit 12 sets the flag region_tile_flag to 0 representing the absence of the tile region address information. Then, the splitting unit 12 supplies to the parallel decoding unit 13 the picture size information, the slice address information, the slice region address information, the flag region_tile_flag, and the encoded data for each slice, as the region information. The process returns to step S16 of FIG. 8, and proceeds to step S17.

FIG. 10 is a flowchart illustrating in detail the slice region address information generation process of step S31 of FIG. 9.

In step S61 of FIG. 10, the splitting unit 12 sets the number of LCUs lcu_width and the number of LCUs sub_lcu_width to the number of LCUs of the picture pic_l-cu_width included in the picture size information supplied from the parameter set decoding unit 11. The splitting unit 12 further sets the number of LCUs lcu_height and the number of LCUs sub_lcu_height to the number of LCUs of the picture pic_lcu_height included in the picture size information.

Further, the splitting unit 12 sets the address first_lcu to the slice address information slice_lcu_addr supplied from the parameter set decoding unit 11.

The splitting unit 12 defines the number of LCUs lcu_width, the number of LCUs lcu_height, the address first_lcu, the number of LCUs sub_lcu_width, and the number of LCUs sub_lcu_height, as the slice region address information. The process returns to step S31 of FIG. 9, and proceeds to step S32.

FIG. 11 is a flowchart illustrating in detail a tile_idx_start calculation process of step S33 of FIG. 9.

In step S81 of FIG. 11, the splitting unit 12 divides the slice address information slice_lcu_addr by the number of LCUs pic_lcu_width, and sets the obtained remainder to a horizontal LCU address slice_lcu_x of the LCU at the head of the slice. The splitting unit 12 further divides the slice address information slice_lcu_addr by the number of LCUs pic_lcu_width, and sets the obtained division value to a vertical LCU address slice_lcu_y of the LCU at the head of the slice.

In step S82, the splitting unit 12 sets to 0 a horizontal LCU address lcu_x and a vertical LCU address lcu_y of the LCU at the head of the tile including the LCU at the head of the slice to be processed, and a horizontal tile address tile_idx_x and a vertical tile address tile_idx_y of the tile including the LCU at the head of the slice to be processed.

In step S83, the splitting unit 12 determines whether the address tile_idx_x is smaller than the number of tiles tile_columns_num. When it is determined that the address tile_idx_x is smaller than the number of tiles tile_columns_num in step S83, the process proceeds to step S84.

In step S84, the splitting unit 12 determines whether the address slice_lcu_x is equal to or larger than the address lcu_x, and smaller than the sum of the address lcu_x and the number of LCUs in a horizontal direction tile_column_width[tile_idx_x] of the tile at the address tile_idx_x. That is, the splitting unit 12 determines whether the address slice_lcu_x is present in the tile at the address tile_idx_x.

When it is determined that the address slice_lcu_x is not equal to or larger than address lcu_x, or not smaller than the sum of the address lcu_x and the number of LCUs tile_column_width[tile_idx_x] in step S84, the process proceeds to step S85.

In step S85, the splitting unit 12 increments the address lcu_x by only the number of LCUs tile_column_width[tile_idx_x], and increments the address tile_idx_x by only 1. The process returns to step S83, and the following steps are repeated.

On the other hand, when it is determined that the address tile_idx_x is not smaller than the number of tiles tile_columns_num in step S83, or the address slice_lcu_x is equal to or larger than address lcu_x, and smaller than the sum of the address lcu_x and the number of LCUs tile_column_width[tile_idx_x] in step S84, the process proceeds to step S86. Therefore, the address tile_idx_x of the tile including the LCU at the head of the slice to be processed can be obtained.

In step S86, the splitting unit 12 determines whether the address tile_idx_y is smaller than the number of tiles tile_rows_num. When it is determined that the address tile_idx_y is smaller than the number of tiles tile_rows_num in step S86, the process proceeds to step S87.

In step S87, the splitting unit 12 determines whether the address slice_lcu_y is equal to or larger than the address lcu_y, and smaller the sum of the address lcu_y and the number of LCUs in a vertical direction tile_row_height[tile_idx_y] of the tile at the address tile_idx_y. That is, the splitting unit 12 determines whether the address slice_lcu_y is present in the tile at the address tile_idx_y.

When it is determined that the address slice_lcu_y is not larger than the address lcu_y, or not smaller than the sum of the address lcu_y and the number of LCUs tile_row_height[tile_idx_y] in step S87, the process proceeds to step S88.

In step S88, the splitting unit 12 increments the address lcu_y by only the number of LCUs tile_row_height [tile_idx_y], and increments the address tile_idx_y by only 1. The process returns to step S86, and the following steps are repeated.

On the other hand, when it is determined that the address tile_idx_y is not smaller than the number of tiles tile_rows_num in step S86, or the address slice_lcu_y is equal to or larger than the address lcu_y, and is smaller than the sum of the address lcu_y and the number of LCUs tile_row_height [tile_idx_y] in step S87, the process proceeds to step S89. Therefore, the address tile_idx_y of the tile including the LCU at the head of the slice to be processed can be obtained.

In step S89, the splitting unit 12 obtains, as the address tile_idx_start, a value by multiplying the address tile_idx_y by the number of tiles tile_columns_num and adding the address tile_idx_x to the product. The process returns to step S33 of FIG. 9, and proceeds to step S34.

FIG. 12 is a flowchart illustrating in detail the tile region address information generation process of step S39 of FIG. 9.

In step S101 of FIG. 12, the splitting unit 12 divides the address tile_idx by the number of tiles tile_columns_num, and sets the obtained remainder to a horizontal tile address tile_idx_x' of the tile at the address tile_idx. The splitting unit 12 further divides the address tile_idx by the number of tiles tile_columns_num, and sets the obtained division value to a vertical tile address tile_idx_y' of tile at the address tile_idx.

Further, the splitting unit 12 sets to 0 a horizontal LCU address tile_lcu_x and a vertical LCU address tile_lcu_y of the LCU at the head of the tile at the address tile_idx, and a horizontal tile address idx_x and a vertical tile address idx_y of a predetermined tile.

In step S102, the splitting unit 12 determines whether the address idx_x is smaller than the address tile_idx_x'. When it is determined that the address idx_x is smaller than the address tile_idx_x' in step S102, the process proceeds to step S103.

In step S103, the splitting unit 12 increments the address tile_lcu_x by only the number of LCUs in a horizontal direction tile_column_width [idx_x] of the tile at the address idx_x. The splitting unit 12 further increments the address idx_x by only 1. The process returns to step S102, and the following steps are repeated.

On the other hand, when it is determined that the address idx_x is not smaller than the address tile_idx_x' in step S102, the process proceeds to step S104. Therefore, the address tile_lcu_x has an integrated value of the number of LCUs of the tiles from address 0 to address tile_idx_x'−1.

In step S104, the splitting unit 12 determines whether the address idx_y is smaller than the address tile_idx_y'. When it is determined that the address idx_y is smaller than the address tile_idx_y' in step S104, the process proceeds to step S105.

In step S105, the splitting unit 12 increments the address tile_lcu_y by only the number of LCUs in a vertical direction tile_row_height[idx_y] of the tile at the address idx_y. The splitting unit 12 further increments the address idx_y by only 1. The process returns to step S104, and the following steps are repeated.

On the other hand, when it is determined that the address idx_y is not smaller than the address tile_idx_y' in step S104, the process proceeds to step S106. Therefore, the address tile_lcu_y has an integrated value of the number of LCUs of the tiles from address 0 to address tile_idx_y'−1.

In step S106, the splitting unit 12 sets the number of LCUs lcu_width to the number of LCUs pic_lcu_width included in the picture size information, and sets the number of LCUs height to the number of LCUs pic_lcu_height included in the picture size information. Further, the splitting unit 12 multiplies the address tile_lcu_y by the number of LCUs pic_lcu_width, and adds the address tile_lcu_x to the product to obtain the address first_lcu. Further, the splitting unit 12 sets the number of LCUs sub_lcu_width to the number of LCUs tile_column_width[tile_idx_x'], and sets the number of LCUs sub_lcu_height to the number of LCUs tile_column height[tile_idx_y'].

The splitting unit 12 defines the number of LCUs lcu_width, the number of LCUs lcu_height, the address first_lcu, the number of LCUs sub_lcu_width, and the number of LCUs sub_lcu_height, as the tile region address information. The process returns to step S39 of FIG. 9, and proceeds to step S40.

FIG. 13 is a flowchart illustrating in detail the region decoding process of step S17 of FIG. 8.

Figure 14:
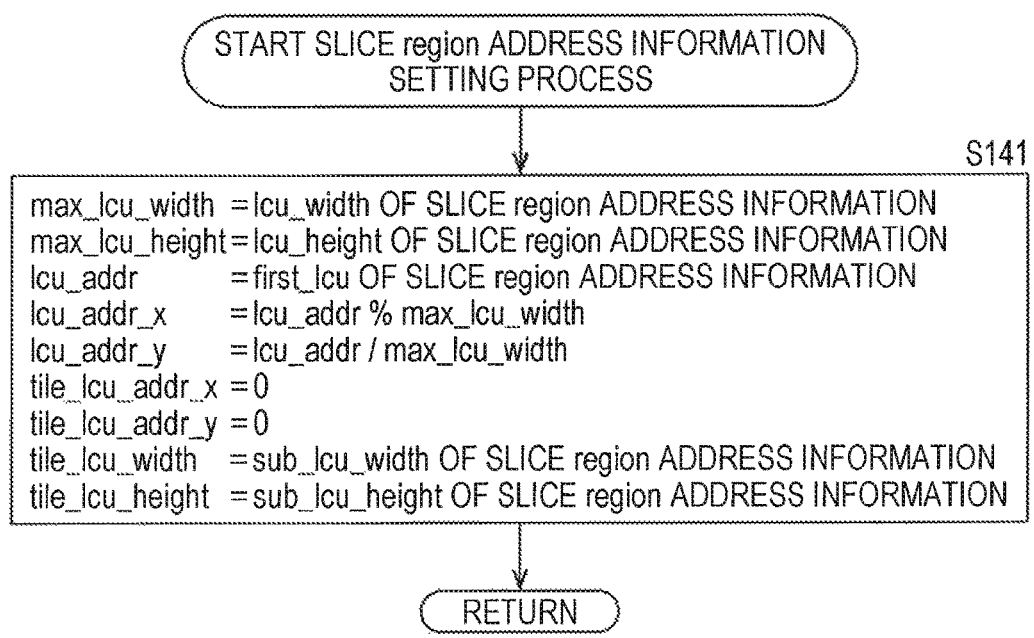
FIG. 14 is a flowchart illustrating in detail a slice region address information setting process of FIG. 13.

In step S121 of FIG. 13, the parallel decoding unit 13 uses the slice region address information to perform the slice region address information setting process for setting an address lcu_addr of the LCU at the head of the unit region for parallel decoding. The slice region address information setting process will be described in detail with reference to FIG. 14 illustrated below.

In step S122, the parallel decoding unit 13 determines whether the flag region_tile_flag supplied from the splitting unit 12 is 1. When it is determined that the flag region_tile_flag is 1 in step S122, the process proceeds to step S123.

In step S123, the parallel decoding unit 13 uses the tile region address information to perform a tile region address information setting process for setting the address lcu_addr. The tile region address information setting process will be described in detail with reference to FIG. 15 illustrated below. After execution of step S123, the process proceeds to step S124.

On the other hand, when it is determined that the flag region_tile_flag is not 1 in step S122, the process skips step S123, and proceeds to step S124. It is noted that the following steps S124 to S127 are performed in parallel for each unit region for parallel decoding, defining the LCU at the address lcu_addr_x to be the LCU positioned at the head.

In step S124, the parallel decoding unit 13 decodes the LCU specified by the address lcu_addr of the encoded data for each slice or tile supplied from the splitting unit 12, with HEVC.

In step S125, the parallel decoding unit 13 performs a next LCU address calculation process for calculating the horizontal LCU address next_lcu_addr_x and the vertical LCU address next_lcu_addr_y of the LCU to be decoded next. The next LCU address calculation process will be described in detail with reference to FIG. 16 illustrated below.

In step S126, the parallel decoding unit 13 determines whether the LCU not having been decoded in step S124 is present in the encoded data for each slice or tile of the unit region to be processed for parallel decoding.

When it is determined that the LCU not having been decoded yet in step S124 is present in step S126, the parallel decoding unit 13 performs an LCU address update process of updating the address lcu_addr in step S127. The LCU address update process will be described in detail with reference to FIG. 17 illustrated below. After execution of step S127, the process returns to step S124, and steps S124 to S127 are repeated until all LCUs of the encoded data for each slice or tile of the unit region to be processed for parallel decoding are decoded.

On the other hand, when it is determined that the LCU not decoded in step S124 is not present, in step S126, the process returns to step S17 of FIG. 8, and the decoding process ends.

FIG. 14 is a flowchart illustrating in detail the slice region address information setting process of step S121 of FIG. 13. The slice region address information setting process is performed for each slice in the picture to be processed.

In step S141 of FIG. 14, the parallel decoding unit 13 sets the number of LCUs in a horizontal direction max_lcu_width of the picture to be processed to the number of LCUs lcu_width of the region address information of the slice to be processed supplied from the splitting unit 12. The parallel decoding unit 13 further sets the number of LCUs in a vertical direction max_lcu_height of the picture to be processed to the number of LCUs lcu_height of the region address information of the slice to be processed.

Further, the parallel decoding unit 13 sets the address lcu_addr to the address first_lcu of the region address information of the slice to be processed. The parallel decoding unit 13 further divides the address lcu_addr by the number of LCUs max_lcu_width, and defines the obtained remainder as the horizontal LCU address lcu_addr_x of the LCU at the head of the unit region for parallel decoding, and the obtained division value as the vertical LCU address lcu_addr_y.

Further, the parallel decoding unit 13 sets 0 a horizontal LCU address tile_lcu_addr_x and a vertical LCU address tile_lcu_addr_y at the head of the tile including the unit region for parallel decoding. The parallel decoding unit 13 further sets the number of LCUs in a horizontal direction tile_lcu_width of the tile including the unit region for parallel decoding to the number of LCUs sub_lcu_width of the region address information of the slice to be processed, and sets the number of LCUs in a vertical direction tile_lcu_height to the number of LCUs sub_lcu_height. The process returns to step S121 of FIG. 13, and proceeds to step S122.

As described above, in the slice region address information setting process, the address lcu_addr is set to the address first_cu of the LCU at the head of the slice to be processed. Further, as described above, in the region decoding process of FIG. 13, when it is determined that the flag region_tile_flag is not 1 in step S122, the process proceeds to step S124, and parallel decoding of the LCU is performed for each unit region for parallel decoding, defining the LCU at the address lcu_addr to be the LCU located at the head. Accordingly, when the flag region_tile_flag is not 1, or when the slice is a smallest independently decodable unit, the parallel decoding of the LCU is performed for each slice.

FIG. 15 is a flowchart illustrating in detail the tile region address information setting process of step S123 of FIG. 13. The slice region address information setting process is performed for each tile in the picture to be processed.

In step S161 of FIG. 15, the parallel decoding unit 13 determines whether the address first_lcu of the region address information of the tile to be processed is larger than the corresponding address lcu_addr set in step S141 of FIG. 14. That is, the parallel decoding unit 13 determines whether the tile to be processed is not the tile at the head in the slice including the tile to be processed.

When it is determined that the address first_lcu of the tile region address information is larger than the corresponding address lcu_addr in step S161, or when the tile to be processed is not the tile at the head in the slice including the tile, the process proceeds to step S162.

In step S162, the parallel decoding unit 13 updates the address lcu_addr to the address first_lcu of the region address information of the tile to be processed. The parallel decoding unit 13 further divides the address first_lcu of the region address information of the tile to be processed by the number of LCUs max_lcu_width, and defines the obtained remainder as the address lcu_addr_x, and the obtained division value as the address lcu_addr_y. The process proceeds to step S163.

On the other hand, when it is determined that the address first_lcu of the region address information of the tile to be processed is not larger than the corresponding address lcu_addr in step S161, or when the tile to be processed is the tile at the head in the slice including the tile, the process skips step S162, and proceeds to step S163.

Therefore, when the tile is the smallest independently decodable unit, the unit region for parallel decoding is defined as the tile, and the address first_lcu of the tile to be processed is defined as the address lcu_addr. Accordingly, parallel decoding of the LCU is performed for each tile. On the other hand, when the slice is the smallest independently decodable unit, the unit region for parallel decoding is defined as the slice, and the address first_lcu of the slice is maintained as the address lcu_addr. Accordingly, parallel decoding of the LCU is performed for each slice.

In step S163, the parallel decoding unit 13 divides the address first_lcu of the region address information of the tile to be processed by the number of LCUs max_lcu_width, and defines the obtained remainder as the address tile_lcu_addr_x, and the obtained division value as the address tile_lcu_addr_y. Further, the parallel decoding unit 13 sets the number of LCUs tile_lcu_width to the number of LCUs sub_lcu_width of the region address information of the tile to be processed, and sets the number of LCUs tile_lcu_height to the number of LCUs sub_lcu_height of the region address information of the tile to be processed. The process returns to step S123 of FIG. 13, and proceeds to step S124.

FIG. 16 is a flowchart illustrating in detail the next LCU address calculation process of step S125 of FIG. 13.

In step S181 of FIG. 16, the parallel decoding unit 13 obtains, as the address next_lcu_addr_x, a value by subtracting the address tile_lcu_addr_x from the address lcu_addr_x and adding 1 to the difference. In this case, the address next_lcu_addr_x has an LCU number counted from the LCU at the head of the unit region to be processed for parallel decoding of the next LCU in the horizontal direction of the current LCU to be decoded.

In step S182, the parallel decoding unit 13 determines whether the address next_lcu_addr_x is equal to or larger than the number of LCUs tile_lcu_width. When it is determined that the address next_lcu_addr_x is equal to or larger than the number of LCUs tile_lcu_width in step S182, the process proceeds to step S183.

In step S183, the parallel decoding unit 13 changes the address next_lcu_addr_x to the address tile_lcu_addr_x, and increments the address next_lcu_addr_y by only 1. That is, the parallel decoding unit 13 defines the LCU in the head column and in the next row to the current LCU to be decoded, in the tile, as the next LCU to be decoded. The process returns to step S125 of FIG. 13, and proceeds to step S126.

On the other hand, when it is determined that the address next_lcu_addr_x is not equal to or larger than the number of LCUs tile_lcu_width in step S182, the process proceeds to step S184.

In step S184, the parallel decoding unit 13 increments the address next_lcu_addr_x by only 1, but does not change the address next_lcu_addr_y. That is, the parallel decoding unit 13 defines the LCU in the next column and in the same row as the current LCU to be decoded, as the next LCU to be decoded. The process returns to step S125 of FIG. 13, and proceeds to step S126.

FIG. 17 is a flowchart illustrating in detail the LCU address update process of step S127 of FIG. 13.

In step S201 of FIG. 17, the parallel decoding unit 13 multiplies the address next_lcu_addr_y by the number of LCUs max_lcu_width, and sets a value obtained by adding the address next_lcu_addr_x to the obtained multiplication value to the address lcu_addr. The parallel decoding unit 13 further sets the address lcu_addr_x to the address next_lcu_addr_x, and sets the address lcu_addr_y to the address next_lcu_addr_y.

As described above, the decoding device 10 decodes an image in parallel for each tile, so that the image can be decoded fast. Further, when the smallest independently decodable unit is the tile, the decoding device 10 decodes the image in parallel for each tile, and when the smallest independently decodable unit is the slice, the decoding device 10 decodes the image in parallel for each slice. Accordingly, the size of a circuit can be reduced, compared with separate circuits prepared for parallel decoding for each slice and parallel decoding for each tile.

It is noted that the information extracted by the parameter set decoding unit 11 may be included in a parameter set other than the SPS or the PPS. Further, the names of the information to be extracted are not limited to the above-mentioned names.

<Description of Computer According to Embodiment of Present Technique>

The above-mentioned series of processes may be performed by hardware or software. When the above-mentioned series of processes is performed by the software, a program constituting the software is installed in a computer. The computer includes a computer incorporated into dedicated hardware, a computer, for example, a general-purpose personal computer configured to execute various functions by installing various programs, or the like.

FIG. 18 is a block diagram illustrating an exemplary configuration of the hardware of the computer performing the above-mentioned series of processes by the program.

In the computer, a central processing unit (CPU) 201, read only memory (ROM) 202, and random access memory (RAM) 203 are connected with each other by a bus 204.

Further, the bus 204 is connected to an input/output interface 205. The input/output interface 205 is connected to an input unit 206, an output unit 207, a storage unit 208, a communication unit 209, and a drive 210.

The input unit 206 includes a keyboard, a mouse, a microphone, or the like. The output unit 207 includes a display, a speaker, or the like. The storage unit 208 includes a hard disk, volatile memory, or the like. The communication unit 209 includes a network interface or the like. The drive 210 drives a removable medium 211 such as a magnetic disk, an optical disk, a magnetooptical disk, or a semiconductor memory.

In the computer configured as described above, the CPU 201 loads the program stored for example in the storage unit 208 into the RAM 203 through the input/output interface 205 and the bus 204, and executes the program. Thereby, the above-mentioned series of processes is performed.

The program executed by the computer (CPU 201) can be provided by being recorded in, for example, the removable medium 211 as a package medium or the like. Additionally, the program can be provided through a wired or wireless transmission medium such as a local area network, the Internet, or digital satellite broadcasting.

In the computer, the program can be installed in the storage unit 208 through the input/output interface 205, by mounting the removable medium 211 to the drive 210. Additionally, the program can be received at the communication unit 209 through the wired or wireless transmission medium, and installed in the storage unit 208. The program can be previously installed in the ROM 202 or the storage unit 208.

It is noted that the program executed by the computer may be a program for executing the processes in time series along the order having been described in the present description, or a program for executing the processes in parallel or with necessary timing, for example, when evoked.

When the above-mentioned series of processes is performed by the software as described above, the library size of the computer can be reduced, compared with a computer having separate functions prepared for parallel decoding for each slice and parallel decoding for each tile.

The present technique is not intended to be limited to the above-mentioned embodiments, and various modifications and variations may be made without departing from the scope and spirit of the present technique.

For example, the present technique may include a cloud computing configuration for sharing one function between a plurality of apparatuses through the network.

The steps having been described in the above-mentioned flowchart can be performed by the one apparatus, and further shared between the plurality of apparatuses.

Further, when one step includes a plurality of processes, the plurality of processes of the one step may be performed by the one apparatus, and further shared between the plurality of apparatuses.

It is noted that the present technique also may include the following configuration.

(1)

A decoding device including a parallel decoding unit configured to decode an image in parallel for each tile.

(2)

The decoding device according to (1), wherein, when a smallest unit for independent decoding of the image is a tile, the parallel decoding unit decodes the image in parallel for each tile.

(3)

The decoding device according to (1) or (2), wherein a smallest unit for independent decoding of the image is a slice, the parallel decoding unit decodes the image in parallel for each slice.

(4)

The decoding device according to (1), wherein, when a flag representing whether the tile is present in the image represents the absence of the tile, the parallel decoding unit decodes the image in parallel for each slice.

(5)

A decoding method including a parallel decoding step in which a decoding device decodes an image in parallel for each tile.

(6)

A program for causing a computer to function as a parallel decoding unit configured to decode an image in parallel for each tile.

REFERENCE SIGNS LIST

10 Decoding device
13 Parallel decoding unit

The invention claimed is:

1. A decoding device comprising a parallel decoding unit configured to
determine whether a smallest unit for independent decoding of an image is a slice or a tile, based on at least one of slice address information and tile address information representing an address of a largest coding unit (LCU) at the head of the image, and
decode the image in parallel for each slice or for each tile of the image,
wherein, when it is determined that the smallest unit for independent decoding of the image is the slice, the parallel decoding unit decodes the image in parallel for each slice based on the slice address information,
wherein, when it is determined that the smallest unit for independent decoding of the image is the tile, the parallel decoding unit decodes the image in parallel for each tile based on the tile address information, and wherein the parallel decoding unit is implemented via at least one processor.

2. The decoding device according to claim 1, wherein, when it is determined that the smallest unit for independent decoding of the image is the slice, the parallel decoding unit decodes the image in parallel for each slice based on the slice address information representing an address of the LCU at the head of each slice.

3. The decoding device according to claim 1, wherein the parallel decoding unit generates the tile address information.

4. The decoding device according to claim 1, wherein, when it is determined that the smallest unit for independent decoding of the image is the tile, the parallel decoding unit decodes the image in parallel for each tile, based on the tile address information representing an address of the LCU at the head of each tile.

5. The decoding device according to claim 1, wherein the parallel decoding unit generates the tile address information.

6. The decoding device according to claim 1, wherein, when a flag is detected representing whether a particular tile is present in the image represents absence of the particular tile, the parallel decoding unit decodes the image in parallel for each slice.

7. A decoding method, implemented via at least one processor, the method comprising:

determining whether a smallest unit for independent decoding of an image is a slice or a tile, based on at least one of slice address information and tile address information representing an address of a largest coding unit (LCU) at the head of the image; and parallel decoding including decoding the image in parallel for each slice or for each tile of the image, wherein, when it is determined that the smallest unit for independent decoding of the image is the slice, the parallel decoding decodes the image in parallel for each slice based on the slice address information, and wherein, when it is determined that the smallest unit for independent decoding of the image is the tile, the parallel decoding decodes the image in parallel for each tile based on the tile address information.

8. A non-transitory computer-readable medium having embodied thereon a program, which when implemented by a computer, causes the computer to execute a method, the method comprising:

determining whether a smallest unit for independent decoding of an image is a slice or a tile, based on at least one of slice address information and tile address information representing an address of a largest coding unit (LCU) at the head of the image; and parallel decoding including decoding an image in parallel for each slice or for each tile of the image, wherein, when it is determined that the smallest unit for independent decoding of the image is the slice, the parallel decoding decodes the image in parallel for each slice based on the slide address information, and wherein, when it is determined that the smallest unit for independent decoding of the image is the tile, the parallel decoding decodes the image in parallel for each tile based on the tile address information.

9. The decoding device according to claim 1, wherein the image is split into a plurality of tiles according to a determined maximum number of tiles.

10. The decoding method according to claim 7, wherein the image is split into a plurality of tiles according to a determined maximum number of tiles.

11. The non-transitory computer-readable medium according to claim 8, wherein the image is split into a plurality of tiles according to a determined maximum number of tiles.

* * * * *